(12) United States Patent  
Gottmann et al.

(10) Patent No.: US 8,986,900 B2
(45) Date of Patent: *Mar. 24, 2015

(54) METHOD OF CONTROLLING A FUEL CELL SYSTEM USING IMPEDANCE DETERMINATION

(71) Applicant: Bloom Energy Corporation, Sunnyvale, CA (US)

(72) Inventors: Matthias Gottmann, Sunnyvale, CA (US); Patrick Muhl, Mountain View, CA (US); Chad Pearson, Mountain View, CA (US); James Daniel Smith, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,616

(22) Filed: Dec. 4, 2013

(65) Prior Publication Data

US 2014/0093802 A1    Apr. 3, 2014

Related U.S. Application Data

(63) Continuation of application No. 12/379,618, filed on Feb. 25, 2009, now Pat. No. 8,652,697.

(51) Int. Cl.
*H01M 8/04* (2006.01)

(52) U.S. Cl.
CPC ...... *H01M 8/04641* (2013.01); *H01M 8/04552* (2013.01); *H01M 8/04686* (2013.01); *H01M 8/04753* (2013.01); *Y02E 60/50* (2013.01)
USPC ........................................... 429/432

(58) Field of Classification Search
USPC ........................................... 429/432
See application file for complete search history.

(56) References Cited

U.S. PATENT DOCUMENTS

| | | |
|---|---|---|
| 5,518,829 A | 5/1996 | Satake et al. |
| 5,589,017 A | 12/1996 | Minh |
| 5,641,585 A | 6/1997 | Lessing et al. |
| 5,733,499 A | 3/1998 | Takeuchi et al. |
| 5,955,392 A | 9/1999 | Takeuchi et al. |
| 6,001,761 A | 12/1999 | Hata et al. |
| 6,361,892 B1 | 3/2002 | Ruhl et al. |
| 6,492,053 B1 | 12/2002 | Donelson et al. |
| 6,582,845 B2 | 6/2003 | Helfinstine et al. |
| 6,589,681 B1 | 7/2003 | Yamanis |
| 6,638,575 B1 | 10/2003 | Chen et al. |
| 6,691,095 B2 * | 2/2004 | Singh et al. ...................... 706/2 |
| 6,835,488 B2 | 12/2004 | Sasahara et al. |
| 7,045,237 B2 | 5/2006 | Sridhar et al. |
| 7,422,810 B2 | 9/2008 | Venkataraman et al. |
| 7,919,348 B2 * | 4/2011 | Akram et al. .................... 438/64 |
| 8,039,154 B2 * | 10/2011 | Morita et al. ................. 429/428 |
| 8,173,063 B2 | 5/2012 | Zobl et al. |

(Continued)

*Primary Examiner* — Caleb Henry
(74) *Attorney, Agent, or Firm* — The Marbury Law Group PLLC

(57) ABSTRACT

A method of controlling a fuel cell system includes applying alternating current (AC) signals to an individual fuel cell. The AC signals have a plurality of different frequencies. A voltage across the individual fuel cell is determined at each of the plurality of different frequencies. An impedance characteristic of the individual fuel cell is determined based at least in part on the voltage across the individual fuel cell at each of the plurality of different frequencies. The individual fuel cell is controlled based at least in part on the impedance characteristic.

14 Claims, 3 Drawing Sheets

(56) References Cited

U.S. PATENT DOCUMENTS

| | | |
|---|---|---|
| 8,652,697 B2* | 2/2014 | Gottmann et al. ............ 429/432 |
| 2003/0041445 A1* | 3/2003 | Jang et al. .................... 29/623.1 |
| 2005/0287402 A1* | 12/2005 | Maly et al. ...................... 429/13 |
| 2006/0078788 A1* | 4/2006 | Ramschak ...................... 429/90 |
| 2007/0172708 A1* | 7/2007 | Takebe et al. .................. 429/13 |
| 2007/0259256 A1* | 11/2007 | Le Canut et al. ............... 429/90 |
| 2007/0262648 A1* | 11/2007 | McKenzie ...................... 307/64 |
| 2008/0075985 A1* | 3/2008 | Gottmann ....................... 429/13 |
| 2008/0124590 A1* | 5/2008 | Ballantine et al. ............. 429/13 |
| 2008/0318089 A1* | 12/2008 | Schneider et al. ............. 429/13 |
| 2010/0216043 A1* | 8/2010 | Gottmann et al. ............ 429/432 |
| 2011/0300461 A1* | 12/2011 | Manabe et al. ............... 429/428 |

* cited by examiner

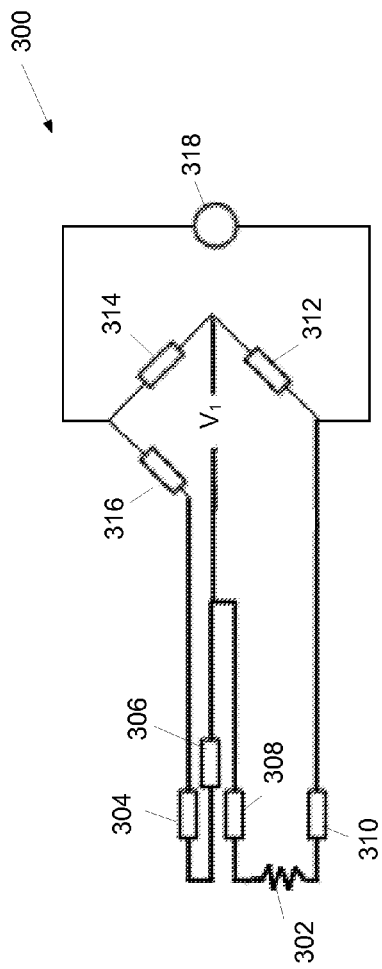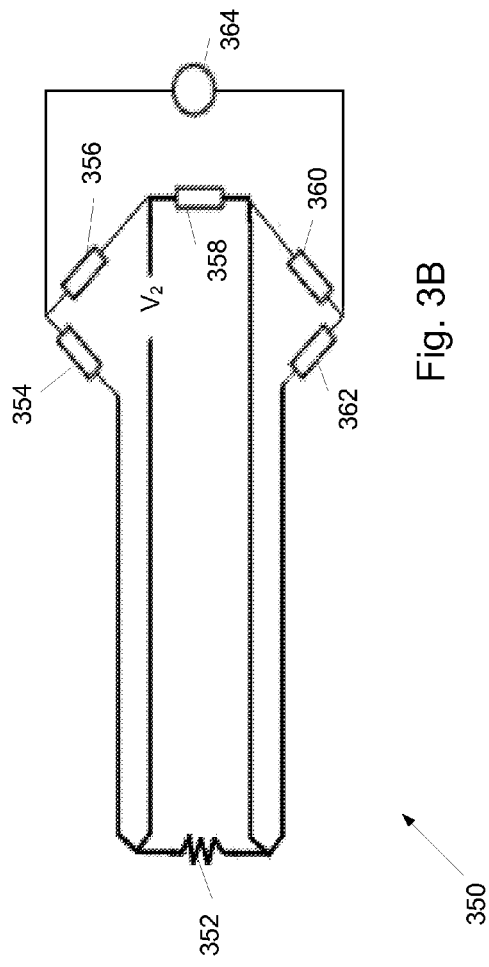
Fig. 3A
Fig. 3B

US 8,986,900 B2

METHOD OF CONTROLLING A FUEL CELL SYSTEM USING IMPEDANCE DETERMINATION

FIELD

The subject of the present disclosure relates generally to fuel cell systems. More specifically, the subject of the present disclosure relates to a system, method, and apparatus for monitoring fuel cell systems to improve efficiency and longevity.

BACKGROUND

Fuel cells are electrochemical devices which can convert energy stored in a fuel to electricity with a high efficiency. To attain a particular voltage or current, a plurality of individual fuel cells can be combined into units called fuel cell stacks, in which the individual fuel cells are electrically connected in series to one another. A plurality of fuel cell stacks can be electrically connected to one another to form a fuel cell column. A fuel cell system can refer to one or more individual fuel cells, one or more fuel cell stacks, and/or one or more fuel cell columns. Fuel cell systems can be used in a variety of power supply applications.

To maximize the efficiency and longevity of a fuel cell system, proper operating conditions must be maintained. For example, inefficient operation may result if too much or too little fuel is used by the fuel cell system, or if the temperatures of the individual fuel cells deviate from a preferred temperature range. Wide temperature distributions among fuel cells are particularly common in Solid Oxide Fuel Cell systems, and can result in large variances in cell performance. In order to maintain proper operating conditions, it is desirable to continually monitor and adjust the fuel cell system and one or more peripheral devices which are in electrical communication with the fuel cell system.

SUMMARY

An exemplary method of controlling a fuel cell system includes applying alternating current (AC) signals to an individual fuel cell. The AC signals have a plurality of different frequencies. A voltage across the individual fuel cell is determined at each of the plurality of different frequencies. An impedance characteristic of the individual fuel cell is determined based at least in part on the voltage across the individual fuel cell at each of the plurality of different frequencies. The individual fuel cell is controlled based at least in part on the impedance characteristic.

An exemplary system for controlling a fuel cell system is also provided. The system includes means for applying alternating current (AC) signals to an individual fuel cell, where the AC signals have a plurality of different frequencies. The system also includes means for determining a voltage across the individual fuel cell at each of the plurality of different frequencies. The system also includes means for determining an impedance characteristic of the individual fuel cell based at least in part on the voltage across the individual fuel cell at each of the plurality of different frequencies. The system further includes means for controlling the individual fuel cell based at least in part on the impedance characteristic.

An exemplary control system for a fuel cell system is also provided. The control system includes a monitoring circuit and a processor operatively coupled to the monitoring circuit. The monitoring circuit includes a power supply configured to apply alternating current (AC) signals to an individual fuel cell, where the AC signals have a plurality of different frequencies. The processor is configured to determine a voltage across the individual fuel cell at each of the plurality of different frequencies. The processor is also configured to determine an impedance characteristic of the individual fuel cell based at least in part on the voltage across the individual fuel cell at each of the plurality of different frequencies. The processor is further configured to control the individual fuel cell based at least in part on the impedance characteristic.

An exemplary method for monitoring peripheral devices of a fuel cell system is also provided. The method includes receiving an input signal, where the input signal is associated with a peripheral device. A voltage is compared to a first reference voltage and to a second reference voltage, where the voltage is based at least in part on the input signal. The second reference voltage has a greater magnitude than the first reference voltage. A warning indication is provided if the voltage is greater than the first reference voltage. An error indication is provided if the voltage is greater than the second reference voltage.

An exemplary fuel cell system fault circuit is also provided. The fuel cell system fault circuit includes a capacitor, a first comparator, a second comparator, a first indicator, and a second indicator. The capacitor is in electrical communication with an input signal for a peripheral device. A voltage across the capacitor is based at least in part on the input signal. The first comparator is configured to compare the voltage across the capacitor to a first reference voltage. The second comparator is configured to compare the voltage across the capacitor to a second reference voltage. The first indicator is configured to provide a warning indication if the voltage across the capacitor is greater than the first reference voltage. The second indicator is configured to provide an error indication if the voltage across the capacitor is greater than the second reference voltage. The second reference voltage has a greater magnitude than the first reference voltage.

Other features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

FIG. 3A is a monitoring circuit for one or more individual fuel cells in accordance with a first illustrative embodiment.

FIG. 3B is a monitoring circuit for one or more individual fuel cells in accordance with a second illustrative embodiment.

DETAILED DESCRIPTION

A fuel cell system can utilize and be in electrical communication with peripheral devices such as pressure switches, fans, blowers, thermal switches, etc. A malfunction of a peripheral device can result in reduced performance of and/or damage to the fuel cell system. The inventors have perceived that traditional fuel cell systems are unable to adequately monitor peripheral devices or detect malfunctioning peripheral devices, resulting in increased costs due to down time and the need to replace equipment. As such, the inventors have perceived a system, method, and apparatus for monitoring peripheral devices and detecting a peripheral device fault in a fuel cell system.

Figure 1:
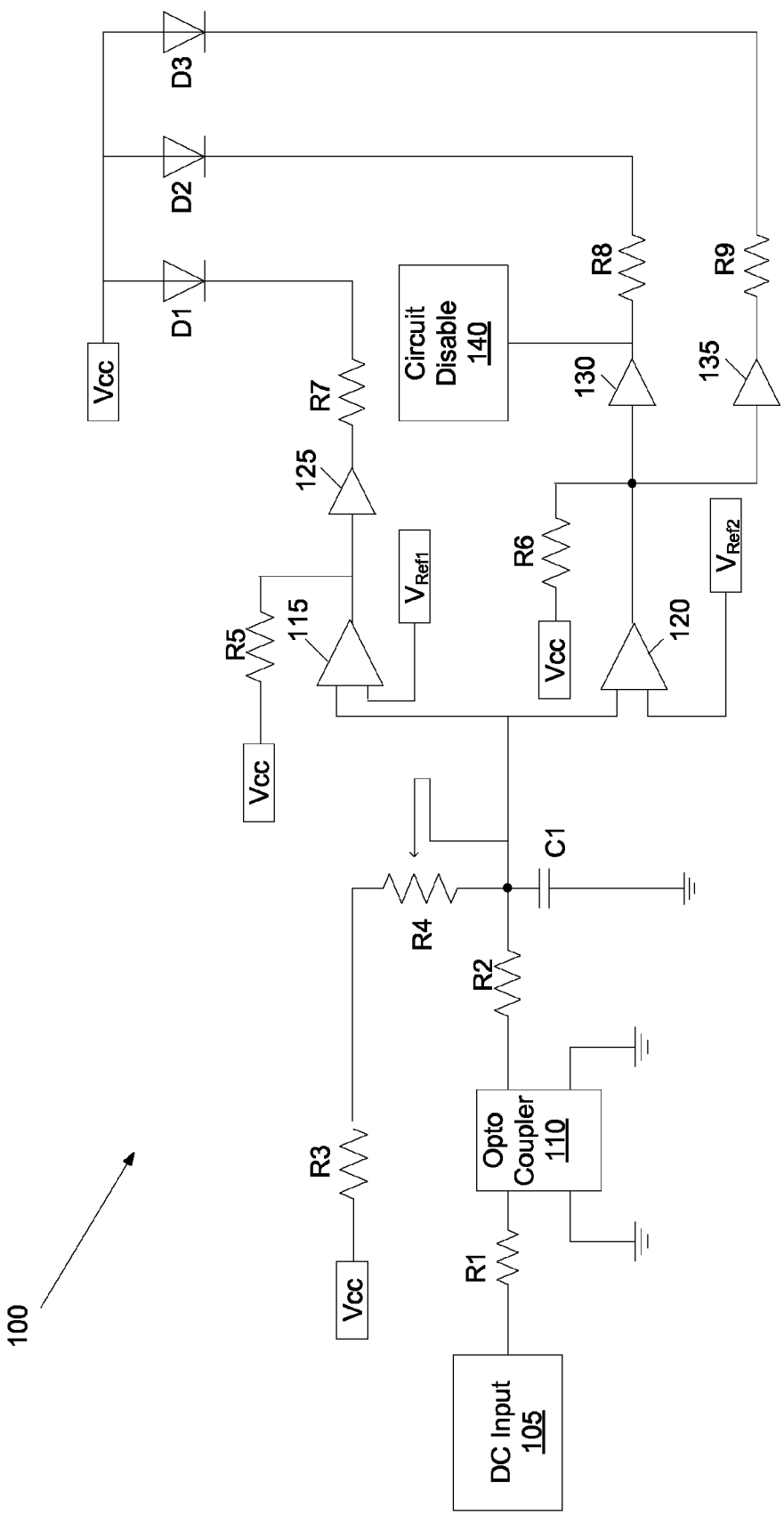
FIG. 1 is a diagram illustrating a fuel cell system fault circuit with a signal alert in accordance with an illustrative embodiment.

FIG. 1 is a diagram illustrating a fuel cell system fault circuit 100 with a signal alert in accordance with an illustrative embodiment. As described in more detail below, fuel cell system fault circuit 100 is configured to detect a drop in voltage from a direct current (DC) input 105, and to provide alerts in the event of such a voltage drop. Fuel cell system fault circuit 100 includes DC input 105, resistors R1-R3 R3 and R5-R9, a variable resistor R4, an opto coupler 110, a capacitor C1, a first reference voltage $V_{Ref1}$, a second reference voltage $V_{Ref2}$, a comparator 115, a comparator 120, a non-inverting hex driver 125, a non-inverting hex driver 130, an inverting hex driver 135, a circuit disable 140, a supply voltage Vcc, and diodes D1-D3. In alternative embodiments, fuel cell system fault circuit 100 may include additional, fewer, and/or different components. In other alternative embodiments, fuel cell system fault circuit 100 may be implemented in any other way to achieve the functions described herein.

Direct current input 105 can be in electrical communication with and used to provide power to or be an output from one or more peripheral devices associated with a fuel cell system (not shown). As such, monitoring a voltage level of DC input 105 can help avoid an error or other failure associated with the one or more peripheral devices and/or the fuel cell system. In one embodiment, DC input 105 can have a voltage of 24 volts (V). Alternatively, any other voltage may be used. Diodes D1-D3 can be light emitting diodes (LEDs) configured to indicate a status of DC input 105. Diode D3 can be a green LED configured to indicate a normal operating condition, diode D1 can be a yellow LED configured to warn of a potential problem, and diode D2 can be a red LED configured to indicate a system error. Alternatively, other colors may be used. Diodes D1-D3 can provide status information to a user such that the user can take corrective action in the event that diode D1 or diode D2 is illuminated. Diodes D1-D3 may also provide status information to an automated control system configured to take corrective action. In alternative embodiments, audible indicators and/or any other indicators such as a display screen may be used in conjunction with or instead of diodes D1-D3.

During normal operation, diode D3 can be illuminated to indicate that there is no problem with DC input 105. An output of DC input 105 can be provided to opto coupler 110 via resistor R1. Resistor R1 can be used to limit an input current from DC input 105. In one embodiment, resistor R1 can have a value of 2.49 kilo-ohms and can limit the input current from DC input 105 to 9.6 milliAmps (mA). Alternatively, any other value(s) may be used. Opto coupler 110 can be used to electrically isolate the signal from DC input 105 from a remainder of fuel cell system fault circuit 100, thereby reducing electrical noise. In an illustrative embodiment, opto coupler 110 can be configured to be in a static on condition during operation of fuel cell system fault circuit 100. Resistor R2 can be used to limit an output current of opto coupler 110. In one embodiment, resistor R2 can have a value of 604 ohms and can limit the output current from opto coupler 110 to 19.8 mA. Alternatively, any other value(s) may be used.

In one embodiment, first reference voltage $V_{Ref1}$ can have a value of 1.25 V and second reference voltage $V_{Ref2}$ can have a value of 9.5 V. In alternative embodiments, other values may be used, with $V_{Ref1} < V_{Ref2}$. Capacitor C1 can have a value of 1000 micro Farads (μF). Alternatively, any other value may be used. During normal operation of fuel cell system fault circuit 100, capacitor C1 can be statically discharged to zero or approximately zero (i.e., ~0.15 millivolts (mV)). As such, the voltage into comparator 115 can be less than first reference voltage $V_{Ref1}$, and the voltage into comparator 120 can be less than second reference voltage $V_{Ref2}$ during normal operation. As the voltage into comparator 115 is less than first reference voltage $V_{Ref1}$, an output of comparator 115 can be high during normal operation. The high output of comparator 115 can be the same as or similar to supply voltage Vcc of fuel cell system fault circuit 100. The high output of comparator 115 is not inverted by non-inverting hex driver 125 (which can act as a signal buffer), and current is not drawn through diode D1 such that diode D1 remains off.

Similarly, the voltage into comparator 120 during normal operation is less than second reference voltage $V_{Ref2}$, resulting in a high output of comparator 120. The high output of comparator 120 can be the same as or similar to supply voltage Vcc. The high output of comparator 120 is not inverted by non-inverting hex driver 130 (which can act as a signal buffer), and current is not drawn through diode D2. As such, diode D2 remains off. However, the high output of comparator 120 is inverted by inverting hex driver 135, and current is drawn through diode D3 to indicate that there is not a problem with DC input 105. Resistor R5 and resistor R6 can be pull-up resistors as known to those of skill in the art. In one embodiment, resistor R5 can have a value of 5.1 kilo-ohms and resistor R6 can have a value of 6.1 kilo-ohms. Alternatively, other values may be used. Resistors R7-R9 can be used to limit the output current of diodes D1-D3, respectively, to 1.2 mA. Alternatively, any other output current value may be used.

A voltage drop or disturbance at DC input 105 can cause capacitor C1 to charge. Capacitor C1 can charge at a rate determined by multiplying the resistance of variable resistor R4 by the capacitance of capacitor C1. As such, the rate at which capacitor C1 charges can be based at least in part on the capacitance of capacitor C1 and at least in part on the resistance of variable resistor R4. If the voltage drop at DC input 105 is not immediately rectified, the voltage on capacitor C1 can continue to increase until the voltage exceeds first reference voltage $V_{Ref1}$. As such, the voltage on capacitor C1 can be greater than first reference voltage $V_{Ref1}$ and less than second reference voltage $V_{Ref2}$. An output of comparator 115 can go low. As a result, current can be drawn through diode D1, and diode D1 can be illuminated. Diode D1 can be used to provide a user or control system with a warning that there is a problem with DC input 105. As described in more detail below, the user or control system can have a limited amount of time (i.e., one or more seconds, one or more minutes, etc.) to correct the problem or shut down the system before the system is automatically disabled. As the voltage into comparator 120 is still less than second reference voltage $V_{Ref2}$, diode D3 can remain on and diode D2 can remain off. In an alternative embodiment, diode D3 may be configured to go off in the event that diode D1 is activated.

If the problem indicated by diode D1 is not corrected, capacitor C1 can continue to charge until the voltage on capacitor C1 exceeds second reference voltage $V_{Ref2}$. The amount of time that it takes for capacitor C1 to charge from first reference voltage $V_{Ref1}$ to second reference voltage $V_{Ref2}$ can be determined by the resistance of variable resistor R4 and the capacitance of capacitor C1. As such, capacitor C1 and variable resistor R4 can act as a timer to control the amount of time between activation of diode D1 and diode D2. In an illustrative embodiment, fuel cell system fault circuit 100 can be maintenance free after initially setting variable resistor R4 to a desired value. If the voltage on capacitor C1 exceeds second reference voltage $V_{Ref2}$, the output of comparator 120 can go low. As a result, current can flow through diode D2 such that diode D2 is illuminated. Inverting hex driver 135 can invert the low signal to high, thereby causing the current flow through diode D3 to stop such that diode D3 is turned off. Circuit disable 140 can also be activated as a result of the low output from non-inverting hex driver 130. Circuit disable 140 can be used to shut down the fuel cell system, shut down a portion of the fuel cell system, deactivate peripheral devices, etc.

Fuel cell system fault circuit 100 has been described with reference to the circuit illustrated in FIG. 1. However, it is important to understand that the process described herein is not limited to the circuit configuration of FIG. 1. For example, in one embodiment, diode D1 and/or diode D2 may be replaced by or used in conjunction with one or more audible alerts to indicate that there is a problem with DC input 105. Similarly, other circuit configurations and/or equivalent circuit components may be used. Fuel cell system fault circuit 100 can also be used as a frequency to voltage converter with fewer frequency restrictions than available frequency to voltage converters.

Figure 2:
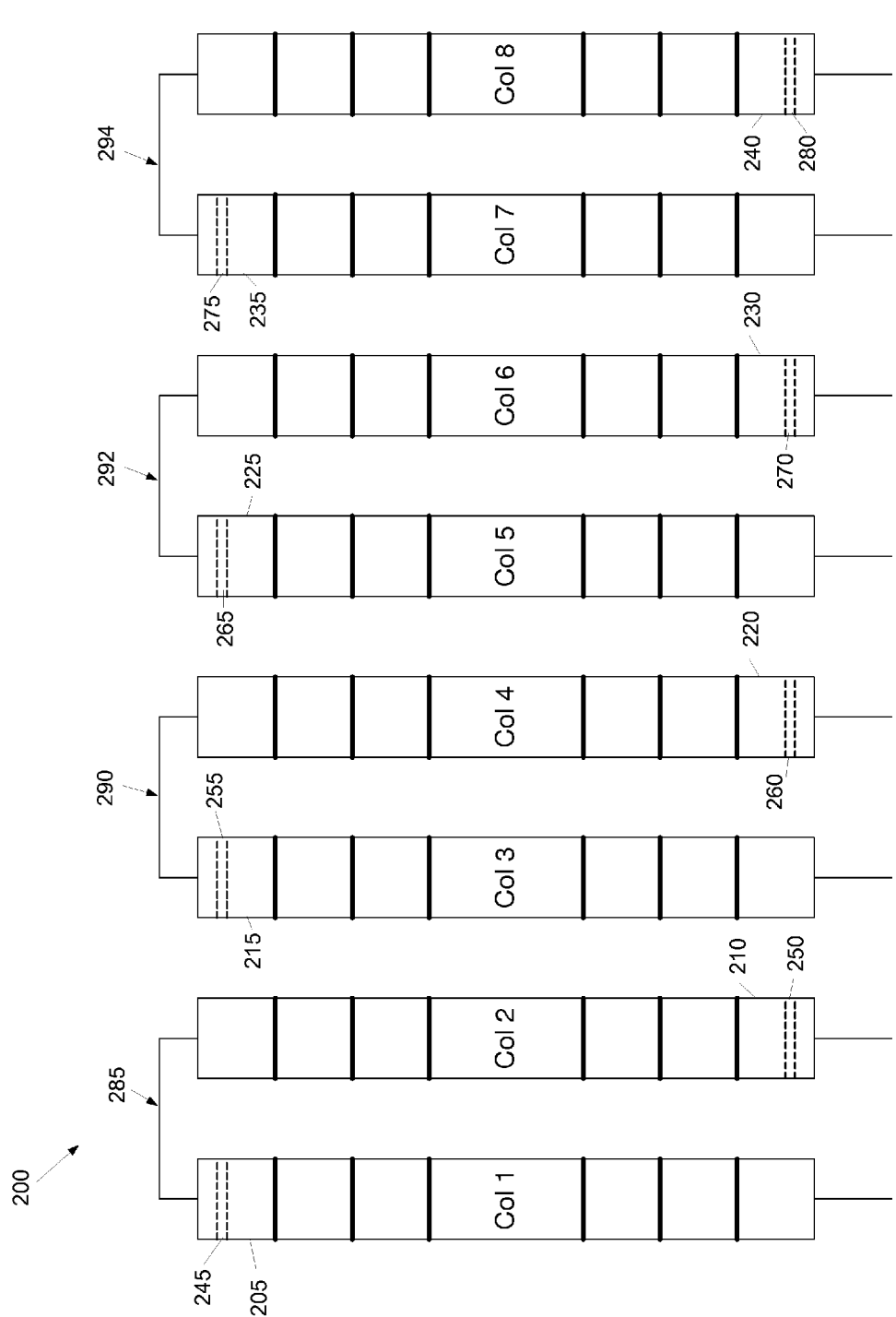
FIG. 2 is a diagram illustrating at least a portion of a fuel cell system in accordance with an exemplary embodiment.

FIG. 2 is a diagram illustrating at least a portion of a fuel cell system 200 in accordance with an exemplary embodiment. In an illustrative embodiment, fuel cell system 200 may be cooled to prevent overheating and damage to the individual fuel cells and other components of fuel cell system 200. Fuel cell system can be cooled through convection (i.e., into the process air stream), radiation (i.e., to surrounding hardware), conduction (i.e., via stack fixtures), and/or any other cooling process known to those of skill in the art, such as for example chemical cooling due to endothermic internal hydrocarbon fuel reformation reaction at the fuel cell anode electrodes (for fuel cells which contain an internal fuel reformation catalyst in or adjacent to the anode electrodes). However, even with the use of a cooling technique, individual fuel cells of fuel cell system 200 can vary significantly in temperature from one another during fuel cell system operation. The temperature variation from individual fuel cell to individual fuel cell can result in varying fuel cell performance. As such, it is desirable to monitor fuel cell characteristics to optimize fuel cell performance.

Fuel cell systems are traditionally monitored through temperature and/or voltage measurements which are taken across a plurality (i.e., 24, 32, etc.) of individual fuel cells. For example, a traditional monitoring system may measure the voltage or temperature across 32 individual fuel cells to characterize the operating characteristics of the 32 individual fuel cells. The inventors have perceived that determining operating characteristics over a plurality of individual fuel cells can be overly expensive, inaccurate, and inefficient. For example, a voltage across 32 or more individual fuel cells may be a high voltage that can only be measured using expensive equipment with a high voltage rating. Further, measuring a high voltage using high voltage rated equipment is less likely to be accurate than measuring a smaller voltage. As a simple example, to achieve a 1% error when measuring a voltage of 1 V, a resistor having a small power rating may be used. To achieve a 1% error when measuring a voltage of 400 V, a resistor with a significantly larger power rating may have to be used, resulting in a more expensive and complex monitoring system.

As such, the inventors have perceived of monitoring a fuel cell system by determining operating characteristics over a single individual fuel cell. Not only do individual fuel cell measurements provide more detailed information than the measurement of a whole fuel cell stack or column, such measurements are also easier to perform and more accurate. Measurements of individual fuel cells can also be performed with cheaper and smaller components. The operating characteristics of multiple individual fuel cells can be utilized to extrapolate the operating characteristics of individual fuel cells located between the monitored individual fuel cells. In an illustrative embodiment, individual fuel cells to be monitored can be at geographic extremes of a configuration of fuel cells such as a fuel cell column, a fuel cell stack, etc. Alternatively, the individual fuel cells to be monitored can be positioned at any other locations in a configuration of fuel cells. For example, every other individual fuel cell may be monitored, every third individual fuel cell may be monitored, every fourth individual fuel cell may be monitored, etc. In another alternative embodiment, every individual fuel cell in fuel cell system 200 may be monitored.

The inventors have further perceived that traditional fuel cell system monitoring procedures are limited because they do not monitor fuel cell impedance. As discussed in more detail below, the impedance characteristic of one or more fuel cells can be used to optimize fuel flow rate, to minimize ripple currents, to determine fuel cell deterioration, etc. As such, the inventors have perceived of a fuel cell monitoring and control system that determines fuel cell impedance at the level of an individual fuel cell.

Referring again to FIG. 2, fuel cell system 200 includes a plurality of fuel cell columns, each of which includes a plurality of fuel cell stacks. For simplicity, only a single fuel cell stack from each fuel cell column is referenced with a number. As such, a first fuel cell column (Col 1) includes a fuel cell stack 205, and a second fuel cell column (Col 2) includes a fuel cell stack 210. Similarly, a third fuel cell column (Col 3) includes a fuel cell stack 215, a fourth fuel cell column (Col 4) includes a fuel cell stack 220, a fifth fuel cell column (Col 5) includes a fuel cell stack 225, a sixth fuel cell column (Col 6) includes a fuel cell stack 230, a seventh fuel cell column (Col 7) includes a fuel cell stack 235, and an eighth fuel cell column (Col 8) includes a fuel cell stack 240.

Each of fuel cell stacks 205, 210, 215, 220, 225, 230, 235, and 240 includes a plurality of individual fuel cells. For simplicity, only a single individual fuel cell is illustrated with dashed lines in each of first fuel cell column (Col 1) through eighth fuel cell column (Col 8). As such, fuel cell stack 205 includes an individual fuel cell 245, fuel cell stack 210 includes an individual fuel cell 250, fuel cell stack 215 includes an individual fuel cell 255, fuel cell stack 220 includes an individual fuel cell 260, fuel cell stack 225 includes an individual fuel cell 265, fuel cell stack 230 includes an individual fuel cell 270, fuel cell stack 235 includes an individual fuel cell 275, and fuel cell stack 240 includes an individual fuel cell 280.

As illustrated with reference to FIG. 2, first fuel cell column (Col 1) and second fuel cell column (Col 2) are electrically connected to form a combined fuel cell column 285. Similarly, third fuel cell column (Col 3) and fourth fuel cell column (Col 4) are electrically connected to form a combined fuel cell column 290, fifth fuel cell column (Col 5) and sixth fuel cell column (Col 6) are electrically connected to form a combined fuel cell column 292, and seventh fuel cell column (Col 7) and eighth fuel cell column (Col 8) are electrically connected to form a combined fuel cell column 294. As such, individual fuel cell 245 and individual fuel cell 250 are at geographic extremes of combined fuel cell column 285. Similarly, individual fuel cells 255 and 260 are at geographic extremes of combined fuel cell column 290, individual fuel cells 265 and 270 are at geographic extremes of combined fuel cell column 292, and individual fuel cells 275 and 280 are at geographic extremes of combined fuel cell column 294.

In an illustrative embodiment, combined fuel cell column 285 can be monitored by monitoring individual fuel cell 245 and individual fuel cell 250. Individual fuel cells 245 and 250 can be monitored using one more monitoring circuits (not shown). In one embodiment, the one or more monitoring circuits can be Wheatstone bridge detection circuits as known to those of skill in the art. Illustrative bridge monitoring circuits are described in more detail below with reference to FIGS. 3A and 3B. Alternatively, any other type of circuit, sensor, and/or software may be used to monitor individual fuel cells 245 and 250. The monitored characteristics of individual fuel cells 245 and 250 can include voltage, current, impedance, temperature, and/or any other operating characteristic(s).

In one embodiment, operating characteristics of non-measured individual fuel cells in a given fuel cell stack, fuel cell column, and/or combined fuel cell column can be determined through extrapolation. As a simple example, a measured/determined temperature of individual fuel cell 245 may be 700 degrees Celsius, a measured/determined temperature of an individual fuel cell X (not shown) may be 746 degrees Celsius, and there may be 22 individual fuel cells located in between individual fuel cell 245 and individual fuel cell X. Using basic extrapolation, it can be estimated that the temperature of a first individual fuel cell located next to individual fuel cell 245 (and in between individual fuel cell 245 and individual fuel cell X) is 702 degrees Celsius. It can further be estimated that the temperature of a second individual fuel cell located next to the first individual fuel cell is 704 degrees Celsius, and so on. Similarly, it can be estimated that the temperature of an individual fuel cell located next to individual fuel cell X (and in between individual fuel cell 245 and individual fuel cell X) is 744 degrees Celsius, and so on. Individual fuel cell X can be in fuel cell stack 205, in first fuel cell column (Col 1), in combined fuel cell column 285, or otherwise positioned relative to individual fuel cell 245. In alternative embodiments, any other extrapolation or other method(s) may be used to determine operating characteristics of individual fuel cells positioned proximate to monitored individual fuel cells. Combined fuel cell columns 290, 292, and 294 can be similarly monitored.

In an illustrative embodiment, the monitoring circuit(s) used to monitor individual fuel cells can be placed on an input/output (I/O) card which can be integrated into a system I/O for fuel cell system 200. In one embodiment, a monitoring circuit may be connected to an individual fuel cell using leads such that the monitoring circuit can be positioned in a cold zone (i.e., a location not exposed to excessive heat) of fuel cell system 200. The leads can be made from thermocouple wire configured to sustain high temperatures (i.e., at temperatures above 660 degrees Celsius). Alternatively, any other type of wire configured for use in high temperature applications may be used. In one embodiment, the lead wires can be non-current carrying wires to avoid any voltage drop which may occur from running current through a sensing wire. Non-current carrying wires can also be used such that the measured signal is conveyed to the monitoring circuit without noise degradation. In another illustrative embodiment, each individual fuel cell to be monitored may have its own monitoring circuit. Alternatively, a given monitoring circuit may include a multiplexer such that the monitoring circuit is able to switch between and monitor a plurality of individual fuel cells.

In one embodiment, the overall impedance of an individual fuel cell can be determined by measuring a voltage across the individual fuel cell and using electrochemical impedance spectroscopy (EIS) as known to those of skill in the art. As described in more detail below, a phase angle (with reference to the excitation being used) can also be determined for each measured voltage. The individual fuel cell can be switched such that the individual fuel cell is loaded and unloaded at a plurality of desired sampling frequencies. A voltage and a corresponding phase angle of the individual fuel cell can be determined at each of the plurality of desired sampling frequencies, and can be converted into an impedance using EIS or any other method known to those of skill in the art. Alternatively, a current or other characteristic of the individual fuel cell may be determined at each of the plurality of desired frequencies and converted into impedances.

Results of the EIS procedure (i.e., the impedance at varying frequencies) can be graphically represented using a Nyquist plot or Bode plot as known to those of skill in the art. As such, the overall impedance characterization, including an ohmic resistance $R_S$ and a polarization resistance $R_P$, of the individual fuel cell can be determined. The ohmic resistance $R_S$ can refer to the impedance of the individual fuel cell at a high frequency limit. As known to those of skill in the art, the polarization resistance $R_P$ can be used to determine a corrosion rate of the individual fuel cell. Similarly, the Nyquist plot (or other method) can also be used to determine an activation resistance of the individual fuel cell and/or a utilization (or diffusion) resistance of the individual fuel cell. As known to those of skill in the art, the x axis of a Nyquist plot is the real part of the measured impedances and the y axis is the imaginary part of the measured impedances. The distance between each point on the plot and the origin of the plot represents a magnitude of the measured impedance. The angle between a line from the origin to a point on the plot and the x axis can be a phase angle of the impedance for a given frequency. In alternative embodiments, any other method may be used to determine the impedance characterization of the individual fuel cell.

FIG. 3A is a monitoring circuit 300 in accordance with a first illustrative embodiment. In one embodiment, at least a portion of monitoring circuit 300 can be placed in a cold zone of a fuel cell system to be monitored such that monitoring circuit 300 is not subjected to excessive temperatures. The cold zone can be located outside of a hotbox of the fuel cell system. An illustrative hotbox is described in detail in U.S. Pat. No. 7,422,810, the disclosure of which is incorporated herein by reference in its entirety. Monitoring circuit 300 can be used to determine a voltage of an individual fuel cell 302. Monitoring circuit 300 can be connected to individual fuel cell 302 using non-current carrying thermocouple wires. Alternatively, any other type of wires may be used. Monitoring circuit 300 includes a resistor 304, a resistor 306, a resistor 308, a resistor 310, a resistor 312, a resistor 314, and a resistor 316. Monitoring circuit 300 further includes a power supply 318. In alternative embodiments, fewer resistors may be used or an alternative configuration of resistors may be used. For example, resistors 304, 306, and 316 may be combined into a single resistor. An output voltage $V_1$ of monitoring circuit 300 can be used to determine the voltage across individual fuel cell 302. Output voltage $V_1$ can be measured using a voltage meter (not shown), a multimeter, a potentiometer, an oscilloscope, or any other voltage measurement device. Output voltage $V_1$ can, in turn, be used to determine an impedance of individual fuel cell 302. In one embodiment, monitoring circuit 300 can have an accuracy range from 0-12 ohms. Alternatively, any other accuracy range may be used.

In an illustrative embodiment, power source 318 can be an alternating current (AC) power source with a variable frequency. Resistors 304-316 can be resistors having known values. As such, the voltage across individual fuel cell 302 can be determined based on the known voltage and/or current from power source 318, the known values of resistors 304-316, and the value of output voltage $V_1$. The voltage across individual fuel cell 302 can be determined using Kirchhoff's current laws or any other method known to those of skill in the art. A phase angle corresponding to the voltage across individual fuel cell 302 can also be determined using any method known to those of skill in the art. In another illustrative embodiment, output voltage $V_1$ (and the voltage across individual fuel cell 302 and the corresponding phase angle) can be determined at a plurality of different frequencies. The impedance of individual fuel cell 302 can be determined at each of the plurality of different frequencies using electrochemical impedance spectroscopy or any other method known to those of skill in the art. The impedance values can be plotted on a Nyquist plot such that a polarization resistance $R_P$ and/or an ohmic resistance $R_S$ of individual fuel cell 302 can be determined. Alternatively, the polarization resistance $R_P$ and/or ohmic resistance $R_S$ can be determined using any other method.

FIG. 3B is a monitoring circuit 350 in accordance with a second illustrative embodiment. In one embodiment, at least a portion of monitoring circuit 350 can be placed in a cold zone of a fuel cell system to be monitored such that monitoring circuit 350 is not subjected to excessive temperatures. Monitoring circuit 350 can be used to determine a voltage of an individual fuel cell 352. Monitoring circuit 350 can be connected to individual fuel cell 352 using non-current carrying thermocouple wires. Alternatively, any other type of wires may be used. Monitoring circuit 300 includes a resistor 354, a resistor 356, a resistor 358, a resistor 360, and a resistor 362. Monitoring circuit 350 further includes a power supply 364. In alternative embodiments, fewer resistors may be used or an alternative configuration of resistors may be used. An output voltage $V_2$ of monitoring circuit 350 can be used to determine the voltage across individual fuel cell 352. Output voltage $V_2$ can, in turn, be used to determine an impedance of individual fuel cell 352. In one embodiment, monitoring circuit 350 can have an accuracy range from 0-12 ohms. Alternatively, any other accuracy range may be used.

In an illustrative embodiment, power source 364 can be an alternating current (AC) power source with a variable frequency. Resistors 354-362 can be resistors having known values. As such, the voltage across individual fuel cell 352 can be determined based on the known voltage and/or current from power source 364, the known values of resistors 354-362, and the value of output voltage $V_2$. The voltage across individual fuel cell 352 can be determined using Kirchoff's current laws or any other method known to those of skill in the art. A phase angle corresponding to the voltage across individual fuel cell 352 can also be determined using any method known to those of skill in the art. In another illustrative embodiment, output voltage $V_2$ (and the voltage across individual fuel cell 352 and the corresponding phase angle) can be determined at a plurality of different frequencies. As such, the overall impedance characteristic, including a polarization resistance $R_P$ and an ohmic resistance $R_S$, of individual fuel cell 352 can be determined using the same methods described with reference to FIG. 3A.

In one embodiment, a control system can be coupled to the monitoring circuit and configured to determine the impedance characteristic of individual fuel cells and/or control the fuel cell system. The control system can include a processor configured to determine a voltage across an individual fuel cell at each of a plurality of different frequencies. The processor can also determine the impedance characteristic of the individual fuel cell and control the individual fuel cell and/or fuel cell system based at least in part on the impedance characteristic. The processor can be a computer processor, dedicated control circuit, etc. Controlling the fuel cell system can include adjusting a fuel flow rate to one or more individual fuel cells, shutting down the fuel cell system in the event of an identified problem, adjusting the fuel cell system based on deteriorated fuel cells, etc. The control system can also include a memory for storing algorithms and other information for use in determining the impedance characteristic, a user interface, and a display. In another illustrative embodiment, any of the operations and processes described herein can be implemented through computer-readable instructions stored on a computer-readable medium. The computer-readable instructions can cause a computing device to perform the operations and processes upon execution of the computer-readable instructions by a processor associated with the computing device.

The impedance characteristic of a given individual fuel cell can include the polarization resistance $R_P$, the ohmic resistance $R_S$, the activation resistance, the diffusion resistance, the Nyquist plot of impedance, the Bode plot of impedance, etc. The impedance characteristic can help a user or control system to optimize operating characteristics of the individual fuel cell, to perform module level measurements, to implement stack/column/etc. level control logic, to perform run time optimization for efficiency, power level, and lifetime to prevent degradation, to perform fuel cell system characterization, to obtain test data for provision to a model prediction maintenance tool, etc. The impedance characteristic of a given individual fuel cell can further be used by a user or control system to optimize operating characteristics of an entire fuel cell system using extrapolation. Alternatively, the impedance characteristic can be determined for each individual fuel cell in the fuel cell system.

As an example of optimizing operating characteristics, the impedance characteristic can be used to determine an optimal level of fuel flow into one or more fuel cells of a fuel cell system. Maintaining an optimum fuel flow level is critical to the efficiency and health of the fuel cell system. Operating the fuel cell system at a high fuel utilization rate is desirable because high fuel utilization enhances efficiency and reduces the size of the fuel source needed. Unfortunately, high fuel utilization also increases the risk of fuel starvation, which is a condition where insufficient fuel is present in the anode of one or more fuel cells. Operating at starvation can permanently damage the fuel cell system. In general, if the current drawn from a fuel cell system is expected to be constant, a lower fuel flow rate can be used, thus leading to high utilization. However, if quick transients are expected, a higher rate of fuel flow will allow faster transient responses, which may negate the need for resorting to electrical storage devices such as batteries. Thus, the optimum level of fuel flow is a tradeoff between realizing high efficiency and meeting the constraints of the application/load that utilizes the fuel cell system. The overall impedance characteristic can help a user or control system set a fuel flow rate that can meet the constraints of the application/load of the fuel cell system while maintaining reasonable efficiency.

As a specific example, the impedance characteristic can be used to optimize fuel flow rates based on a non-ohmic over-potential. The impedance of a typical fuel cell, which may be highest at low frequency, can represent a total loss of the fuel cell. The impedance measured at high frequency can represent only fast loss mechanisms such as electron conduction and ion conduction. These losses can be referred to as ohmic losses. The difference between the low and high impedance values of a fuel cell can be referred to as the non-ohmic over-potential, and can be used to determine efficient fuel flow rates. For example, if the non-ohmic over-potential increases above a threshold value, a user or control system can be alerted that the fuel cell system may be near starvation and that the fuel flow should be increased. If the non-ohmic over-potential drops below a threshold value, a user or control system can be alerted that the fuel cell system is being operated at an overly high fuel flow rate, and the fuel flow to the fuel cell system can be decreased.

The impedance characteristic can also be used by a user or control system to maintain a proper temperature of the fuel cell system. The impedance characteristic can further be used by a user or control system to minimize ripple currents through the fuel cells. Ripple currents can refer to alternating current (AC) components of a total current function of a fuel cell or fuel cell system. Ripple currents can cause inefficient power generation by a fuel cell and can damage the fuel cell. The impedance characteristic can also allow a user or control system to improve utilization and efficiency by optimizing the water flow rate when using humidified fuel in a fuel cell system. The impedance characteristic can also include valuable information about the health and stress conditions of a fuel cell system, the degradation of the fuel cell system, and how well the fuel cell system responds to transient changes. Further, monitoring changes in the ohmic resistance $R_S$ of a fuel cell can provide a good measure of fuel cell aging and deterioration.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of controlling a fuel cell system comprising:
   determining an impedance characteristic of at least one fuel cell, wherein the impedance characteristic is determined while the at least one fuel cell is providing power to a load; and
   controlling the at least one fuel cell based at least in part on the impedance characteristic to optimize at least one operational parameter of the at least one fuel cell while the at least one fuel cell continues providing the power to the load,
   wherein controlling the at least one fuel cell based at least in part on the impedance characteristic to optimize the at least one operational parameter of the at least one fuel cell comprises at least one of optimizing a fuel utilization of the fuel cell system or minimizing ripple currents through the at least one fuel cell.

2. The method of claim 1, wherein the impedance characteristic of the at least one fuel cell is determined using electrochemical impedance spectroscopy.

3. The method of claim 1, further comprising determining a second impedance characteristic of a second fuel cell, wherein the second impedance characteristic is based at least in part on extrapolation of the impedance characteristic of the at least one fuel cell.

4. The method of claim 1, further comprising generating a Nyquist plot for the at least one fuel cell, wherein the impedance characteristic is based at least in part on the Nyquist plot.

5. The method of claim 1, wherein the impedance characteristic of the at least one fuel cell includes at least one of an ohmic resistance or a polarization resistance.

6. A method of controlling a fuel cell system comprising:
   loading and unloading at least one fuel cell at a plurality of different frequencies;
   determining a voltage across the at least one fuel cell at each of the plurality of different frequencies using a monitoring circuit, wherein the voltage is determined while the at least one fuel cell is providing power to a load;
   determining, based at least in part on the voltage across the at least one fuel cell at each of the plurality of different frequencies, an impedance characteristic of the at least one fuel cell; and
   controlling the at least one fuel cell based at least in part on the impedance characteristic to optimize at least one operational parameter of the at least one fuel cell while the at least one fuel cell continues providing the power to the load,
   wherein controlling the at least one fuel cell based at least in part on the impedance characteristic to optimize the at least one operational parameter of the at least one fuel cell comprises at least one of optimizing a fuel utilization of the fuel cell system or minimizing ripple currents through the at least one fuel cell.

7. The method of claim 6, wherein the impedance characteristic of the at least one fuel cell is determined using electrochemical impedance spectroscopy.

8. The method of claim 6, further comprising determining a second impedance characteristic of a second fuel cell, wherein the second impedance characteristic is based at least in part on extrapolation of the impedance characteristic of the at least one fuel cell.

9. The method of claim 6, further comprising generating a Nyquist plot for the at least one fuel cell, wherein the impedance characteristic is based at least in part on the Nyquist plot.

10. The method of claim 6, wherein the impedance characteristic of the at least one fuel cell includes at least one of an ohmic resistance or a polarization resistance.

11. The method of claim 6, wherein controlling the at least one fuel cell based at least in part on the impedance characteristic to optimize the at least one operational parameter of the at least one fuel cell comprises optimizing the fuel utilization of the fuel cell system.

12. The method of claim 6, wherein controlling the at least one fuel cell based at least in part on the impedance characteristic to optimize the at least one operational parameter of the at least one fuel cell comprises minimizing ripple currents through the at least one fuel cell.

13. The method of claim 1, wherein controlling the at least one fuel cell based at least in part on the impedance characteristic to optimize the at least one operational parameter of the at least one fuel cell comprises optimizing the fuel utilization of the fuel cell system.

14. The method of claim 1, wherein controlling the at least one fuel cell based at least in part on the impedance characteristic to optimize the at least one operational parameter of the at least one fuel cell comprises minimizing ripple currents through the at least one fuel cell.

* * * * *